July 5, 1927.

B. H. LAMPERT

TRACK CONSTRUCTION

Filed Jan. 17, 1927

1,634,835

INVENTOR.
Benjamin H. Lampert
BY
Louis O. French
ATTORNEY.

Patented July 5, 1927.

1,634,835

UNITED STATES PATENT OFFICE.

BENJAMIN H. LAMPERT, OF OSHKOSH, WISCONSIN.

TRACK CONSTRUCTION.

Application filed January 17, 1927. Serial No. 161,633.

The invention relates to a track construction, and more particularly to track construction for use in connection with motor-driven vehicles.

Where trucks carrying heavy loads are used on soft ground as, for instance, in concrete highway construction where supply trucks for bringing the aggregates to the mixer have to pass over the subgrade to deposit their loads either into the loading skip of the mixer or adjacent thereto, this subgrade, because of the weight of the trucks and the frequent damp or muddy condition of the soil, does not provide a good foundation for the trucks and soon becomes badly rutted so that great difficulty is experienced in getting the trucks to the unloading point. The object of this invention is to provide a demountable or sectional track construction, upon which the trucks may be driven over soft ground such as above noted, wherein each line of the track consists of a plurality of track sections which are secured together at their ends and are spaced apart to suit the wheel gauge of the trucks by spacing members removably connected with the track sections.

The invention further consists in the several features hereinafter set forth and more particularly defined by claims at the conclusion hereof.

In the drawings Fig. 1 is a side elevation view of a portion of a sectional track embodying the invention;

Figure 1:
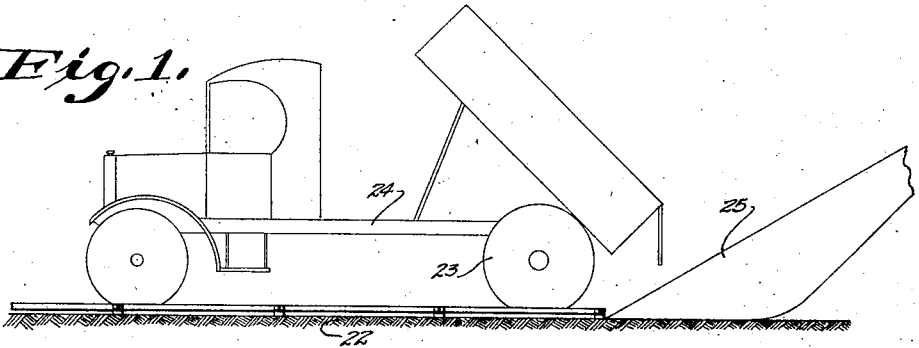
Figure 2:
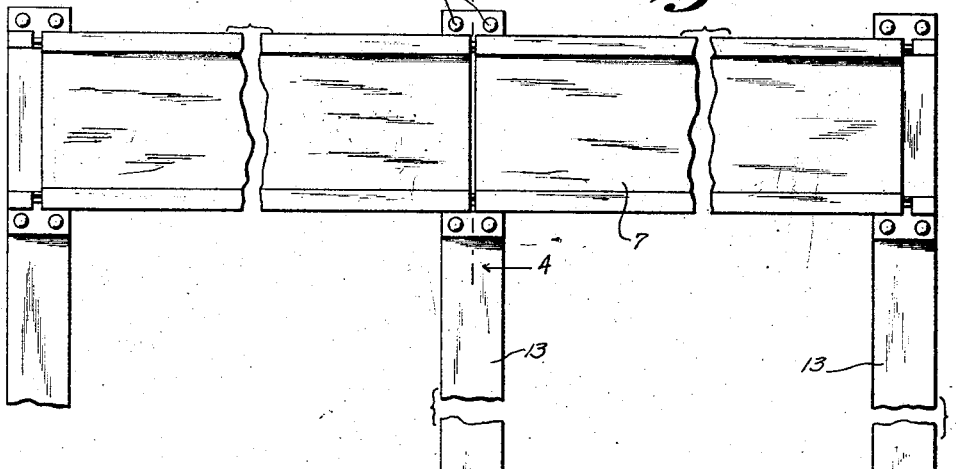
Fig. 2 is a plan view thereof, parts being broken away.
Figure 3:
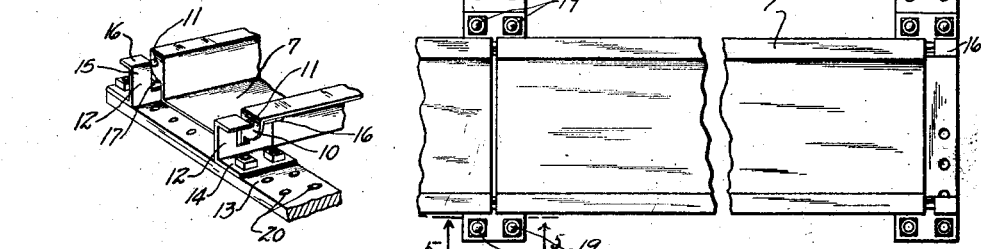
Fig. 3 is a perspective end view of one of the track sections associated with a spacing member.
Figure 4:
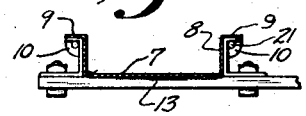
Fig. 4 is a section taken on the line 4—4 of Fig. 2.
Figure 5:
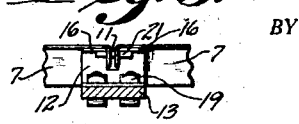
Fig. 5 is a detail sectional view taken on the line 5—5 of Fig. 2.

In the drawings the numeral 7 designates the track sections. Each of these track sections is preferably formed of sheet metal, such as heavy boiler iron, which is stamped or otherwise suitably formed into a wheel-receiving channel section 8 having reinforcing flanges 9 projecting laterally from the flanges of the channel and ears 10 which are welded or otherwise suitably secured to the side flanges of the channel section 8 and the reinforcing flanges 9 and provided with holes 11.

Adjoining sections of the track are secured in alined position by angle brackets 12 of sheet metal mounted on a support 13. Each of the angle brackets consists of a base portion 14, a vertically extending portion 15 and a bifurcated flange portion 16 with a vertically disposed slot 17 between the bifurcations and extending down into the vertical portion 15. On one side of the track these angle members may be fixedly secured to the support 13 in any suitable manner, as by rivets 18. On the other side of the track, in order to adjust the tracks to trucks of different wheel gauges, it is preferred to secure the base portions 14 of the angles in spaced relation to each other and relative to the other side of the track by means of bolts 19, and the supports 13 are provided with a series of sets of holes 20 to permit of this adjustment.

While the supports 13 perform the double function of acting as a tie between the brackets 12 on each side of the track and as a spacing means for the tracks, it will be understood that separate bars, similar to supports 13, can be used to space the sides of the track apart without departing from this invention. Furthermore, it will be understood that the supports 13 are not load supports for the track as they have a relatively small bearing area and the weight of the truck is taken by the track sections themselves, the width of the channel being sufficient to receive the wheels therein.

The adjoining track sections are secured to the brackets 12 by the interfitting relation of the side portions of the channel 8 with the vertical portions 12 of the brackets, the disposition of the ears 10 against the inner sides of the bifurcations 16, and by pins 21 or other suitable fastening means which pass through the holes 11 of the adjoining track sections, and preferably have a clamping engagement with the under side of the bifurcations 16, these pins 21 preferably having a slight taper so as to secure a good fit and to accommodate for possible slight inaccuracies of alinement between the adjacent track sections.

The engagement of the ears 10 with the brackets 12 prevents longitudinal displacement of the track sections relative to each other and the connection of these sections with the spacing members 13 through the angle bars 12, in the present instance, prevents spreading of the lines of the track relative to each other.

In arranging the device for use the spacing members 13 are laid upon the subgrade or the soft soil 22, at appropriate intervals, and the track sections 7 are placed so as to bring their ends of the channel between the spaced brackets 12, with the ears 10 in position, and the pins 21 are then driven into place, with the result that a track of sufficient bearing surface for the wheels 23 of a truck 24 is provided to enable the truck to negotiate the soft ground and deposit its load, as for instance, into a skip 25 of a mixer.

I desire it to be understood that this invention is not to be limited to any particular form or arrangement of parts except in so far as such limitations are specified in the claims.

What I claim as my invention is:

1. In a track construction, the combination of a plurality of angled track sections for wheel vehicles, angled connectors interlocking with adjacent ends of said track sections to prevent longitudinal displacement thereof, and means for preventing lateral displacement of said track sections.

2. In a track construction, the combination of a plurality of channel-shaped track sections having laterally extending flange portions at each end, and spaced brackets between which each of the channel sections of adjoining track sections is disposed and having flanges engageable with the flanges of said track sections to prevent longitudinal movement of said track sections.

3. In a track construction, the combination of a plurality of rail members formed to constitute a track for motor vehicles, said members having ears at their ends, connecting means between adjoining track sections having parts engageable with said ears to prevent longitudinal displacement of said track sections, and means for preventing lateral displacement of said track sections.

4. In a track construction, the combination of a plurality of angled track sections having laterally extending flange portions at each end, spaced brackets between which each of the sections of adjoining track sections is disposed and having flanges engageable with the flanges of said track sections to prevent longitudinal movement of said track sections, and means associated with said brackets and the flanges of said track sections for firmly holding said sections to said brackets.

5. In a track construction, the combination of spaced tracks, each comprising a plurality of angled track sections having laterally extending flange portions at each end, spaced brackets between which each of the sections of adjoining track sections is disposed and having flanges engageable with the flanges of said track sections to prevent longitudinal movement of said track sections, and spacing members to which the brackets of each track are connected.

6. In a track construction, the combination of spaced tracks, each comprising a plurality of angled track sections having laterally extending flange portions at each end, spaced brackets between which each of the sections of adjoining track sections is disposed and having flanges engageable with the flanges of said track sections to prevent longitudinal movement of said track sections, means associated with said brackets and the flanges of said track sections for firmly holding said sections to said brackets, and spacing members to which the brackets of each track are connected.

7. In a track construction, the combination of angled track sections for motor vehicles, a connector for adjoining track sections comprising a bifurcated angle bar, the adjoining ends of each track section having apertured ears abutting against the bifurcations of said angle bar, and fastening means passing through the openings in said ears.

8. In a track construction, the combination of angled track sections for wheel vehicles, a connector for adjoining track sections comprising a bifurcated angle bar, the adjoining ends of each track section having apertured ears abutting against the bifurcations of said angle bar, and fastening means passing through the openings in said ears and engageable with the under side of said bifurcations.

9. In a track construction, the combination of a plurality of angled vehicle-track sections having flanged ends, spaced connectors engaging the adjacent ends of said track sections including means having an interlocking connection with the adjacent flanged ends of adjoining track sections to prevent longitudinal displacement thereof, and means for preventing lateral displacement of said track sections.

In testimony whereof, I affix my signature.

BENJAMIN H. LAMPERT.